May 10, 1949.  E. W. SCHILLING ET AL  2,469,897
METHOD AND APPARATUS FOR RESISTANCE
WELDING OF ALUMINUM
Filed Nov. 10, 1948  2 Sheets-Sheet 1
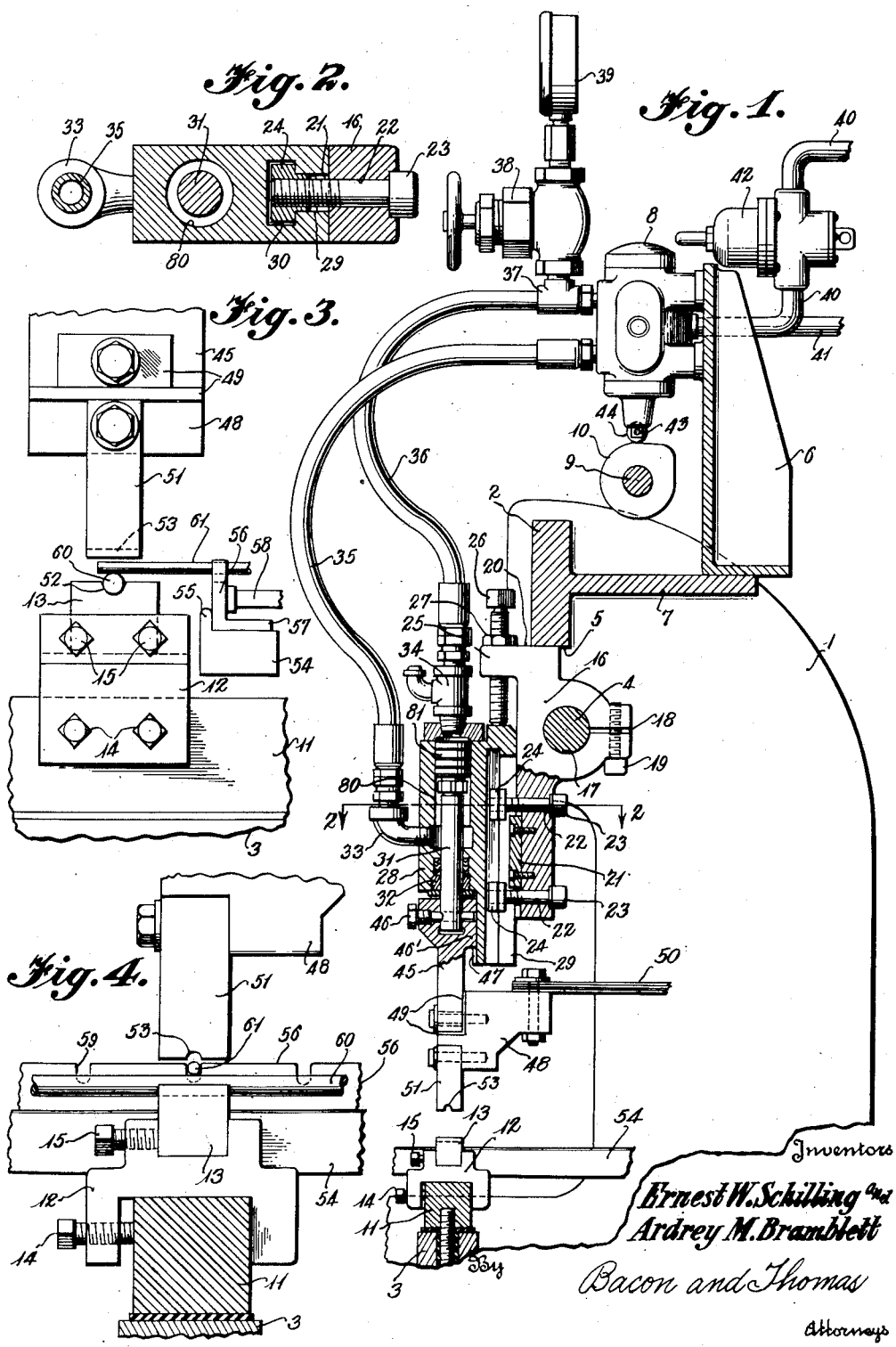
Inventors
Ernest W. Schilling and
Ardrey M. Bramblett
By Bacon and Thomas
Attorneys May 10, 1949.                    E. W. SCHILLING ET AL                    2,469,897
                        METHOD AND APPARATUS FOR RESISTANCE
                                    WELDING OF ALUMINUM
Filed Nov. 10, 1948                                                   2 Sheets-Sheet 2

Inventors
Ernest W. Schilling and
Ardrey M. Bramblett

By  Bacon and Thomas
                    Attorneys

Patented May 10, 1949

2,469,897

UNITED STATES PATENT OFFICE 2,469,897

METHOD AND APPARATUS FOR RESISTANCE WELDING OF ALUMINUM

Ernest W. Schilling and Ardrey M. Bramblett, La Fayette, Ind., assignors to Peerless Wire Goods Co., Inc., La Fayette, Ind., a corporation of Indiana Application November 10, 1948, Serial No. 59,302

4 Claims. (Cl. 219—4)

1

This invention relates to a method and apparatus for resistance welding of aluminum wire or rods and has particular application to the welding of aluminum rods or wires in crossed relationship where one rod or wire has a greater diameter or sectional area than the other.

Heretofore considerable difficulty has been encountered in welding aluminum rods or wires in crossed relationship, whether the rods be of round, rectangular, or other sectional shape. The difficulties arose due to the fact that aluminum melts quite suddenly and is such a good conductor of heat that the entire body tended to collapse at once. In prior welding techniques it has been customary to apply relatively high pressure at the joint of the parts to be welded and due to the above-mentioned characteristic of aluminum the parts usually collapsed so suddenly that the result was merely a splashing of the metal and deformation or destruction of the parts adjacent the joint.

By the present invention a successful method and apparatus for welding crossed aluminum rods has been devised and comprises essentially a pair of electrodes movable toward and from each other and in which the adjacent working faces of the electrodes are provided with grooves to receive the crossed wires in relatively intimate contact and also in which advancing means for the movable electrode acts in such a manner as to apply a uniform and constant pressure to the joint while instantly following, at a controlled rate, the movement of one wire into the other during the actual welding. The intimate contact between the aluminum wires or rods and the electrodes results in a highly heat conductive contact and an electrical conducting contact of low resistance which results in excess heat being conducted from the aluminum into the electrodes and preventing high temperatures being generated at the area of contact due to resistance to the flow of electric current. The means for effecting movement of one electrode toward the other comprises a hydraulically actuated piston to which fluid under a uniformly controlled pressure is admitted at a predetermined rate.

A further feature of the present invention that contributes to its success resides in the fact that the upper electrode is grooved to receive the upper wire and has portions adjacent the groove extending toward the other electrode. These extending portions of the movable electrode will engage and contact the lower wire or rod at the completion of the weld, thus short-circuiting at least a part of the welding current to limit

2 the heat generated at the joint between the wires or rods.

It is an object of this invention to provide a method and apparatus capable of successfully welding aluminum rods at present day production rates.

It is a further object of this invention to provide an apparatus for performing the novel method disclosed herein.

It is a still further object of this invention to provide a welding apparatus that is simple and economical in construction, and yet efficient in operation.

Other objects and advantages will appear as the description of a successful embodiment of the invention proceeds in connection with the accompanying drawings wherein:

Fig. 1 is a vertical sectional view, with certain parts shown in elevation, of a welding machine embodying the present invention;

Fig. 2 is a sectional view, on an enlarged scale, taken substantially on the line 2—2 of Fig. 1 and looking in the direction of the arrows;

Fig. 3 is a front elevational view of a pair of electrodes and work-pieces therebetween in the machine of Fig. 1;

Fig. 4 is a view of the parts shown in Fig. 3 as viewed from the right of Fig. 3;

Thruoghout the various views of the drawings the same reference characters indicate identical parts.

Figure 5:
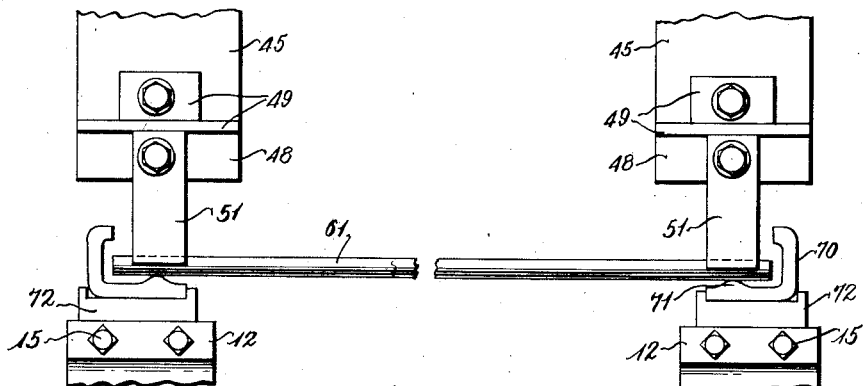
Fig. 5 illustrates a modified form of electrodes adapted to weld rods of different sectional shape from those illustrated in Figs. 1 to 4.

The machine illustrated in Fig. 1 comprises a pair of end frame members 1 (only one of which is shown) to which a T-shaped upper cross member or brace 2 is welded or otherwise rigidly secured. Lower transverse frame members such as 3 are also provided to produce a rigid base frame. Below the T-shaped cross member 2 a transverse shaft or guide 4 is also rigidly attached to the frame and extends substantially parallel to the lower surface 5 of the T-shaped member. A top frame member 6 is welded or otherwise rigidly attached to the horizontally extending web portion 7 of the T-shaped frame member 2 and has attached thereto a plurality of valve mechanisms 8, to be described later. Suitable bearings (not shown) are provided on the frame structure to rotatably support a cam shaft 9 on which a plurality of cams 10 are fixedly mounted. Only one cam is shown in the drawings and only one valve mechainsm 8, but it is to be understood that a plurality of similar units are contemplated.

A transverse conductor or bus bar 11 is mounted on and suitably insulated from the lower frame member 3 and has clamped thereto a plurality of electrode holders 12. Each electrode holder is so constructed that it may removably receive a lower electrode 13. The electrode holder 12 may be clamped to the conductor 11 by means of a set screw 14 and the electrode 13 may be clamped to the holder 12 by one or more set screws such as shown at 15.

A bracket member 16 is provided with a bore 17 therethrough of a diameter substantially equal to the diameter of the shaft or guide 4 and is split, as at 18, whereby it may be clamped to the guide 4 by such means as the cap screw 19, all in a well known manner. The bracket 16 is provided with an upper flat surface 20 so located that it slidingly engages the lower surface 5 of the T-shaped brace 2 and is effective to hold the bracket 16 against rotation about the guide 4 while permitting free sliding movement therealong. The bracket 16 is further provided with a guide block 21 attached to the front surface thereof and which is provided with opposite parallel guide surfaces. The bracket 16 is also provided with openings 22 lying in a plane parallel to the guide surfaces of the block 21 and in which bolts 23 are rotatable. The bolts 23 are each provided with nuts 24 of T-shape in horizontal section.

A lug 25 projects forwardly from the upper end of the bracket 16 and is provided with a threaded opening therethrough through which a stop bolt 26 is threaded. The bolt 26 may be provided with a lock nut 27 to lock the bolt in adjusted position in the lug 25.

A carrier 28 is provided with a vertical slot or groove 29 of such width as to snugly receive the guide block 21 with the side walls of the slot in sliding relation to the opposite parallel guide surfaces of the guide block 21. The slot or groove 29 is undercut, as at 30, adjacent its bottom, to provide a T-slot to slidingly receive the nuts 24. The bolts 23, previously described, extend through the slot or groove 29 and the nuts 24 carried thereby are engaged in the under-cut portion 30 of the slot 29 to further aid in guiding the carrier 28 on the bracket 16.

By the structure thus far described, it will be evident that the carrier 28 may be adjusted vertically on the bracket 16 by loosening the bolts 23 and adjusting the bolt 26 to act as a stop at the desired position of adjustment whereupon the carrier 28 may be moved vertically into engagement with the end of the bolt 26 or by movement of that bolt and upon tightening of bolts 23 the carrier will be locked in adjusted position on the bracket 16. The purpose for this adjustment will be described later.

The carrier 28 is also provided with a cylindrical bore 80 extending vertically therein and in which a piston 81 is slidably received. The piston 81 has a piston rod 31 extending outwardly of the lower end of the carrier 28 and is surrounded at its lower end by a suitable packing gland 32. The carrier 28 is provided with suitable fittings 33 and 34 providing communication with the interior of the cylinder 80 on opposite sides of the piston 81. Flexible conduits 35 and 36 connect the fittings 33 and 34 to appropriate ports of the valve mechanism 8, previously described. Adjacent the upper end of the flexible conduit 36 a T-coupling 37 provides communication, through a valve 38, with a pressure indicator 39. The valve 38 is provided so that the indicator 39 may be hydraulically isolated and not continually subjected to the pressure in the hydraulic system.

Extending rearwardly from the valve mechanism 8 and in communication with the interior thereof is a pair of conduits 40 and 41. The conduit 40 constitutes an inlet to the valve mechanism for conducting fluid under pressure thereto while the conduit 41 is a return line to return spent fluid to the pump or other means (not shown) for supplying fluid under pressure to the machine. A fluid pressure regulator 42 is arranged in the inlet line 40 and is effective to regulate the inlet pressure to the valve mechanism 8 so that it cannot exceed a predetermined maximum value.

The pressure indicator 39 and the pressure regulator 42 will not be described in greater detail since they may take any of many forms, all well known in the art and commercially available.

The valve mechanism 8 has an operating rod 43 slidably extending from the bottom thereof and carrying a roller 44 in position to engage the periphery of the cam 10 previously described. The operating member 43 will preferably be spring pressed downwardly to insure constant contact with the cam 10 and upon vertical reciprocation, under the influence of the cam 10, the valve mechanism will be so conditioned as to connect the inlet line 40 to the flexible conduit 36 and the outlet line 41 to the flexible conduit 35 at one extremity of its movement and to reverse the connections at the other extremity of its movement. The valve mechanism is commercially available, and need not be further described since its specific details form no part of the present invention.

The piston rod 31 previously described extends downwardly a short distance below the lower end of the cylinder 80 and has attached thereto a hammer member 45. The hammer member 45 is provided with a socket to receive the piston rod 31 and a threaded pin 46 threadingly engaged with the hammer member 45 has a shank portion extending through a transverse opening in the piston rod 31 to thereby lock the hammer to the piston rod. Adjacent its top portion, the hammer 45 may have a rearwardly extending lug or boss 46' slidably engaged in and guided by a vertical slot or groove 47 in the front face of the lower portion of the carrier 28 whereby the hammer member 45 is guided along a definite path during reciprocating movements of the piston 81. A connector element 48 is attached to the lower terminus of the hammer member 45 but is suitably electrically insulated therefrom, by insulating material shown at 49 and has a plurality of flexible metallic ribbons 50 connected thereto in electrical conducting relationship. The ribbons 50 are provided to insure a flexible electrically conducting connection from the connector element 48 to a suitable source of welding current. The hammer member 45 and the connector element 48 are preferably made of aluminum or other metal of low specific gravity for a reason to be explained hereafter. An upper electrode 51 is bolted or otherwise attached to the connector element 48 and is preferably directly below the hammer member 45 and the piston rod 31 and also in vertical alignment with the lower electrode 13. Thus vertical movements of the piston 81 will result in movement of the electrode 51 directly toward or from the lower electrode 13.

The lower electrode 13 is provided with a transverse groove 52 in its upper and working face and the upper electrode 51 is provided with a transverse groove 53 in its downwardly facing or lower working face. As shown, the grooves 52 and 53 are arranged at right angles to each other since the parts to be welded are to be welded in cross relationship but it is to be understood that the grooves may be arranged to extend in any desired relative direction, depending only upon the relationship in which the wires or rods constituting the work pieces are to be joined.

Suitably arranged on the frame of the machine, by means not shown, are two or more guide rails 54 (only one being shown in the drawings) having upwardly extending guide flanges 55. A carriage comprising side plates 56 having lower flanges 57 and transverse braces 58 is arranged for sliding movement on the rails 54 to be guided thereon by the upwardly extending flanges 55. The movement of the carriage on the rails is in a direction fore and aft of the machine and transversely of the bus bar 11.

As shown in Fig. 4 the side plates 56 of the carriage are provided with spaced vertical slots 59 in their upper edges and the carriage is further provided with means (not shown) at its ends to support the lower work piece 60 for movement therewith in a direction parallel to its length. The slots 59 in the side plates 56 are arranged to receive the upper work pieces 61 in such position that they rest on the lower work pieces 60 adjacent their ends, in a manner clearly shown in the drawings. It will be apparent that the slots 59 will maintain the upper work pieces 61 in uniform spaced parallel relationship.

Means (not shown) are contemplated to periodically move the carriage and work pieces forwardly in timed relation to the operation of the machine and at each step the movement will be equal to the spacing between the slots 59 and the upper work pieces 60 to thereby position a joint to be welded between the electrodes at each step of movement of the carriage. It will also be apparent that movement of the carriage in the manner described while the upper electrode 51 is in its uppermost position will cause the lower work piece 60 to slide longitudinally in the groove 52.

A suitable source of welding current is contemplated and is electrically connected to the flexible conductors 50 and to the transverse conductor or bus bar 11 through a controlling switch mechanism (not shown). The controlling switch mechanism may be controlled in any suitable manner but will preferably be operated from the shaft 9 and in timed relation to the rotation of the cam 10 carried thereby.

As the shaft 9 rotates, the cam 10 will position the control 43 for the valve 8 to admit pressure from the line 40 to the flexible conduit 35 thus lifting the piston 81 and its connected parts to the position of Fig. 1 while the carriage and work pieces are being moved a single step to position a new joint between the electrodes. After the work has been repositioned in the manner described, the cam 10 will have rotated sufficiently to effect movement of the control 43 to vent the conduit 35 to the return line 41 and to admit pressure from the line 40 to the conduit 36. As a result, the piston 81 and the hammer 45 and electrode 51 will be forced downwardly to cause the electrode 51 to engage and press upon the joint to be welded. After pressure has been applied to the cold joint, the shaft 9 will have reached a position to actuate the control switch mechanism, mentioned above, to complete an electrical circuit through the conductor 50, connector element 48, electrode 51, work pieces 60 and 61, electrode 13 and clamp 12, and the bus bar 11 thereby resulting in passage of current through the joint and welding of the work pieces. As is common practice, the welding current circuit will be broken while pressure is still maintained on the joint and immediately thereafter the cams 10 will recondition the valve mechanism 8 to effect upward movement of the electrode 51 and the previously described cycle of operation will be repeated.

As previously mentioned, the hammer member 45 and the connector element 48 are made of aluminum or other light weight metal to reduce the inertia of the reciprocating parts and thus minimize the impact upon the work pieces when the electrode 51 is brought into engagement therewith. Also, the employment of a hydraulic actuator for the hammer enables the mass of the reciprocating parts of the actuator, i. e., the piston 81 and piston rod 31, to be held to a low value. The adjustment of the carrier 23 relative to the bracket 16 enables the parts to be so positioned that when the piston 81 is in its uppermost position the electrode 51 will be raised only a sufficient distance above the work pieces to permit free movement of the latter therebeneath. By this adjustment the actual range of movement of the reciprocating hammer and its connected parts will be very small and high velocities will not be attained. In the absence of high velocities and due to the light weight of the reciprocating parts, the impact on the joints to be welded will be maintained at a minimum.

The hydraulic operating mechanism described provides means for relatively gradually moving the electrode 51 at a controlled rate until contact with the work pieces is made and, due to the presence of the pressure regulator 42, the pressure exerted on the joint is limited to a predetermined maximum value which cannot be exceeded. Furthermore, as the work pieces soften under the influence of resistance-generated heat, the pressure being constantly applied by the hydraulic system will cause the upper electrode to instantaneously "follow" the softening of the joint to press the work pieces together and effect a satisfactory weld, but the follow-up will be sufficiently limited in rate to prevent impact and splashing of metal. By maintaining a uniform pressure between the electrodes and the joint, intimate contact therebetween is assured and "flash" welds are prevented. It is desirable to limit the maximum pressure applied since aluminum has the previously described characteristic of becoming practically liquid quite suddenly and undue pressure at this time would result in splashing of the molten metal with a resultant weakening or possibly complete destruction of the joint.

As previously described, the upper electrode 51 and the lower electrode 13 are provided with grooves to receive the work pieces. These grooves are preferably of such configuration as to quite snugly receive the work pieces and provide a substantial area of intimate contact therebetween. In the specific embodiment illustrated in the drawings, the groove 52 is of the same radius as the outer surface of the work piece 60 whereby intimate contact is provided between the electrode 15 and the work piece 60 throughout a substantial area extending at least half way around the work piece. This intimate contact results in efficient conduction of heat from the work piece to the electrode, thus preventing the work piece from suddenly collapsing and also provides a very efficient electrical connection of relatively low resistance so that no great amount of heat, due to electrical resistance, will be generated at that interface.

In the embodiment shown, the upper groove 53 is of a slightly greater radius than the upper work piece 61 but it will be apparent that as soon as the joint becomes soft and in condition to be fused, the upper work piece will become sufficiently distorted, due to the pressure being applied, to make intimate contact with the groove 53 throughout substantially the entire surface area of the groove, thus suddenly providing good heat conductivity from the work piece 61 to the electrode 51 and in that manner preventing further undue melting of the work piece and its complete collapse.

Another characteristic of the described mechanism probably contributing materially to its success, resides in the fact that the upper electrode has portions extending toward the lower electrode adjacent the groove 53; that is, the lowermost face of the upper electrode will extend downwardly beyond the topmost part of the upper work piece 61 during the welding operation. As the work pieces are forced together, the electrode 51 will approach the work piece 60 and at the completion of the joint the lowermost face of the electrode 51 will actually make contact with the lower work piece 60, thus short-circuiting at least a part of the welding current around the upper work piece 61 and arresting further melting of the material thereof. At this time, it is to be remembered, the electrodes are in intimate contact with a substantial area of the work pieces and the heat generated will be readily conducted to the electrodes to hasten solidification of the joint. The grooves in the electrodes perform the further function of preventing undue splashing of molten metal as the joint is completed and supporting the soft metal in the desired shape.

Although the specific embodiment illustrated shows a bottom electrode having a groove to snugly receive the lower work piece and an upper electrode loosely receiving the upper work piece, it will be apparent that both grooves may be made to snugly receive their respective work pieces or to both receive them loosely or the snug fitting and loose fitting grooves may be reversed from the manner in which they are shown in the drawings. The snug fitting electrode groove results in maintaining the work piece therein somewhat cooler and if the other work piece is allowed to rise to a higher temperature clearly the cooler work piece will be forced into the body of the other. In this manner, the final form of the joint may be controlled.

Figs. 1 to 4 of the drawings show a machine especially adapted for the welding of cylindrical rods of different diameters in cross relationship. It is to be understood, however, that the invention contemplates the employment of rods or wires of different sectional shape or configuration, such as square or rectangular.

Fig. 5 illustrates another form of lower work piece that may be successfully welded to transverse cylindrical bars. As shown, the lower work piece comprises an extruded channel or angle-shaped work piece 70 having a rib or projection 71 along the face to be joined to the upper work piece 61. In using this type of work piece, the lower electrode 72 will be grooved in a manner to produce the desired results, bearing in mind the explanation of the effect of such grooving as set forth above.

Figure 6:
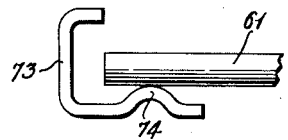
Fig. 6 is a view illustrating a still further modified form of rod successfully welded in the machine of the present invention.

Fig. 6 illustrates another form of bottom work piece 73, similar in most respects to the work piece 70 but being formed of bent sheet metal rather than being of extruded and solid section. The rib or projections 71 of work piece 70, and 74 of work piece 73 provide a very small area of contact between the work pieces at the start of the welding operation, as in the case of the round work pieces of Figs. 1 to 4, to thus introduce a point of high resistance to the welding current. In each of the forms shown in Figs. 5 and 6 the application of pressure during the welding and the instantaneous "follow up" of the upper electrode as the metal softens, results in sinking of the upper work piece through the projection, 71 or 74, into intimate contact with the upper surface of the lower work piece. At the instant of contact with the said upper surface, it is possible that the resistance to the welding current is suddenly decreased, resulting in cessation of the generation of temperatures sufficiently high to effect melting of the metals.

It is also contemplated that one of the work pieces may be notched to initially receive the other work piece and such notching will assist in preventing splashing of the metal and may be necessary in some instances to provide a more nearly flush joint. If desired, the notch may extend only part of the way across the top of the lower work piece.

The welding apparently works best with high resistance aluminum wire. Good success has been had with high magnesium content aluminum alloy wires, which do have relatively high resistance. Successful welds have, however, been made with aluminum alloy wires having as much as 40 percent conductivity based on the conductivity of pure copper.

In a specific instance successful welds were made of one-eighth inch diameter aluminum wire on aluminum wire of one-fourth inch diameter. The pieces were properly cleaned and dried and the welding was performed in accordance with the previous description with 6 volts across the electrodes and between 20,000 and 25,000 secondary amperes. Ten cycles of weld current at 85 percent of heat were performed at each joint and 120 joints per minute per hammer were welded, using a hydraulic pressure of 490 pounds per square inch. The top electrode was provided with a groove $\frac{3}{32}$ of an inch radius and a depth of $\frac{1}{16}$ inch. The bottom electrode was provided with a groove of one-eighth inch radius, $\frac{5}{32}$ of an inch deep. A consecutive run of 216 joints were welded with no mishaps.

As suggested previously, it is contemplated that a plurality of pairs of electrodes, along with the associated mechanisms described, be provided on the machine of this invention whereby a number of simultaneous welds may be made when the nature of the product to be produced so demands. It will be clear that the electrode pairs may be laterally adjusted along the shaft 4 and the bus bar 11 to provide any desired spacing between the pairs.

Although a single embodiment of the invention has been specifically described herein, it is to be understood that the scope of the invention is not limited thereto but may include all other embodiments falling within the scope of the appended claims.

We claim:

1. In a welding apparatus for welding aluminum rods in crossed relation, a pair of electrodes relatively movable toward and from each other, one of said electrodes having a single groove in its working face of a size and shape to snugly receive a portion of one of said rods, the working face of the other electrode having a single groove therein of a size and shape to loosely receive a portion of the other of said rods and to make substantially line contact therewith.

2. In a welding apparatus for welding aluminum rods in crossed relation, a pair of electrodes relatively movable toward and from each other, each of said electrodes having a groove therein to receive one of said rods, the portions of one of said electrodes adjacent the groove therein extending toward the other electrode a sufficient distance to engage the rod therein at the completion of a weld.

3. In a welding apparatus for welding aluminum rods of different sectional areas in crossed relation, a pair of electrodes relatively movable toward and from each other, one of said electrodes having a groove in its working face of a size and shape to snugly receive a portion of one of said rods, the working face of the other electrode having a groove therein of a size and shape to loosely receive a portion of the other of said rods, the portions of the said other electrode adjacent the groove therein extending toward the said one electrode a sufficient distance to engage the rod therein at the completion of a weld.

4. The method of welding aluminum rods in crossed relation which comprises the steps of, positioning the joint to be welded between a pair of electrodes, gradually applying pressure to said joint through said electrodes, then passing welding current through said electrodes and joint while causing said electrodes to approach each other and to apply a limited maximum pressure on said joint, and controlling the rate of relative movement of said electrodes to not exceed a predetermined maximum.

ERNEST W. SCHILLING.
ARDREY M. BRAMBLETT.

REFERENCES CITED

The following references are of record in the file of this patent:

UNITED STATES PATENTS

| Number | Name | Date |
|---|---|---|
| 1,174,446 | Rietzel | Mar. 7, 1916 |
| 1,267,481 | Von Henke | May 28, 1918 |
| 1,744,284 | Speed | Jan. 21, 1930 |
| 1,847,890 | Osborne | Mar. 1, 1932 |
| 2,037,040 | Paugh | Apr. 14, 1936 |
| 2,179,545 | Edge et al. | Nov. 14, 1939 |
| 2,224,821 | Humphrey | Dec. 10, 1940 |
| 2,232,038 | Stone et al. | Feb. 18, 1941 |
| 2,260,928 | Bixby | Oct. 28, 1941 |
| 2,299,776 | Weightman | Oct. 27, 1942 |
| 2,314,099 | Mikkalapov | Mar. 16, 1943 |
| 2,337,037 | Fentress | Dec. 21, 1943 |
| 2,383,695 | Thacker | Aug. 28, 1945 |